United States Patent [19]

Sorensen et al.

[11] Patent Number: 4,807,054
[45] Date of Patent: Feb. 21, 1989

[54] TRANSDUCER SUPPORT ASSEMBLY HAVING LATERALLY OFFSET FLEXURES

[75] Inventors: Scott Sorensen, Louisville; Michael S. Robidart, Pinewood Springs, both of Colo.

[73] Assignee: MiniScribe Corporation, Longmont, Colo.

[21] Appl. No.: 125,743

[22] Filed: Nov. 13, 1987

Related U.S. Application Data

[63] Continuation of Ser. No. 765,713, Aug. 14, 1985, abandoned.

[51] Int. Cl.$^4$ ............................................... G11B 5/48
[52] U.S. Cl. ..................................................... 360/104
[58] Field of Search ............... 360/103, 104, 106, 105, 360/97–99

[56] References Cited

U.S. PATENT DOCUMENTS

| 3,025,710 | 3/1962 | Muffley | 360/98 X |
| 3,646,536 | 2/1972 | Bleiman | 360/103 X |
| 4,167,765 | 9/1979 | Watrous | 360/103 |

FOREIGN PATENT DOCUMENTS

| 3430014 | 3/1985 | Fed. Rep. of Germany | 360/86 |
| 59-58660 | 4/1984 | Japan | 360/104 |
| 59-119581 | 7/1984 | Japan | 360/97 |
| 60-57584 | 4/1985 | Japan | 360/104 |
| 60-89880 | 5/1985 | Japan | 360/104 |
| 60-136978 | 7/1985 | Japan | 360/104 |
| 60-182075 | 9/1985 | Japan | 360/103 |
| 60-193178 | 10/1985 | Japan | 360/103 |
| 60-205880 | 10/1985 | Japan | 360/103 |

Primary Examiner—A. J. Heinz
Attorney, Agent, or Firm—Curtis, Morris & Safford

[57] ABSTRACT

A transducer support assembly for supporting at least two transducers in back-to-back relationship, having particular application in a disk drive of the type having a disk or disk pack therein. The support assembly includes a support leg and a pair of flexure elements mounted in common and in back-to-back relationship on and extending outwardly from the support leg. The flexure elements are of substantially the same size and shape and are formed of flexible material, such as stainless steel, or the like. Longitudinal edge members are provided on the opposite edges of each flexure element, these edge members imparting a stiffening to the flexure element and function in a manner similar to load beams. The flexure elements are mounted offset from each other on the support leg such that their central axes are laterally displaced from each other to avoid interference between a longitudinal edge member of one flexure element and a longitudinal edge member of the other.

12 Claims, 2 Drawing Sheets

TRANSDUCER SUPPORT ASSEMBLY HAVING LATERALLY OFFSET FLEXURES

This application is a continuation of application Ser. No. 765,713, filed Aug. 14, 1985, and now abandoned.

BACKGROUND OF THE INVENTION

This invention relates to a transducer support assembly and, more particularly, for such a support assembly that is particularly designed for use in a disk drive containing a disk pack for playing or playing/recording information on the disks included in that disk pack.

Disk drives have become common peripheral devices for use with information processors, such as computers, for the storage of relatively large amounts of information. Typically, such disk drives are of the so-called rigid disk type in which one or more disks (referred to as a "disk pack") cooperate with a plurality of transducers, conventionally known as record/playback heads, for the magnetic recording and/or reproduction of digital information. Other disk drives are known as "floppy disk" drives in which digital information is magnetically recorded on and reproduced from one or more flexible disks. It also has been proposed to provide non-magnetic disks for information storage purposes, such as optical disks in which information is optically read from a disk, and capacitive disks in which information recorded on or in the surface of a disk is capacitively picked up therefrom. The aforementioned disk drives are provided as separate units disposed in housings that are separate and apart from the information processing system with which they are used; and, more recently, such disk drives have been physically incorporated into the same overall cabinet that houses the information processing system, such as so-called microcomputers, minicomputers, or the like.

One objective in designing disk drives for use with microcomputers in particular is to minimize the overall physical size of the disk drive while increasing the storage capacity thereof. Storage capacity is improved by recording a greater number of tracks on the surface of each disk and by disposing several disks within the disk drive housing. As the number of such disks (i.e. the number of disks included in the disk pack) increases, the available space and physical tolerances within the disk drive housing are reduced. For example, if two disks are disposed within the housing, four disk surfaces are available for recording/reproducing data. Typically, a transducer, or magnetic head, cooperates with a surface for the purpose of writing information thereon and reading information therefrom. However, because of reduced space within the housing, the transducers which cooperate with the bottom surface of one disk and the facing top surface of the other may potentially interfere.

One type of support assembly that has been proposed for a disk drive of the aforementioned type is described in Volume 26, No. 3A, IBM Technical Disclosure Bulletin, August 1983, pages 1250–1252. In that assembly, the head is supported on a flexible suspension formed of thin sheet metal, and this suspension is, in turn, mounted on a rigid support arm, the latter being positioned on an actuator carriage or other carrier. Each flexible suspension bends to urge the head toward or against the disk. When the disk rotates, the head "rides" on a thin film of air so as to avoid contact with the disk and reduce the risk of damage.

In the just-mentioned transducer assembly, two pairs of heads are mounted on respective flexible suspensions, each pair cooperating with the top and bottom surfaces, respectively, of a single disk. One rigid support arm supports one suspension whose head cooperates with the top surface of a first disk, and another rigid support arm supports another suspension whose head cooperates with the bottom surface of a second disk. A third support arm, disposed between the first and second arms, supports two suspensions, one of which carries a head that cooperates with the bottom surface of the first disk and the other of which carries a head that cooperates with the top surface of the second disk. Thus, the central support arm carries two suspensions, but this central support arm is sufficiently thick that the two suspensions are mounted on the opposite (top and bottom) surfaces of that arm. The separation between these suspensions, defined primarily by the thickness of the support arm, is sufficient to avoid interference between the suspensions during operation or during initial "loading", or assembly, of the suspensions and heads with respect to the disks.

As the size and interior spatial dimensions of disk drives decreases, the thickness of the respective support arms likewise decreases. In a disk drive of the type with which the present invention finds ready application, the support arm is sufficiently thin that if suspensions are mounted on the opposite (top and bottom) surfaces thereof, as in the arrangement described in the aforementioned IBM Technical Disclosure Bulletin, those suspensions would interfere with each other during initial "loading" of the head assembly and possibly during actual operation of the disk drive. Furthermore, it is preferred to provide suspensions that are far simpler to manufacture than the type shown in the aforementioned IBM Technical Disclosure Bulletin; and one type of preferred suspension is shown in U.S. Pat. No. 4,443,824. When suspensions of this preferred type are used in disk drives having limited interior spatial dimensions, the problem of interference therebetween becomes more pronounce.

OBJECTS OF THE INVENTION

Therefore, it is an object of the present invention to provide an improved transducer support assembly that is particularly adapted for use in disk drives having limited interior space, and which avoids the aforementioned problems and disadvantages attending the prior art assemblies.

Another object of this invention is to provide an improved transducer support assembly having a pair of flexure elements mounted in noninterference back-to-back relationship and on which transducers are supported.

A further object of this invention is to provide a transducer support assembly of the aforementioned type for use with a disk-pack having at least two storage disks, the assembly supporting at least four transducers for cooperating with the respective surfaces of the disks.

An additional object of this invention is to provide a transducer support assembly of the aforementioned type in which the heads are mounted on flexure elements which, in turn, are mounted in back-to-back and offset relationship on a support leg, whereby interference between those flexure elements is avoided.

Yet another object of this invention is to provide a transducer support assembly of the aforementioned type in which the flexure elements include loading means to impart stiffening to the flexure elements, these elements being mounted on a support leg whereby interference between those loading beams is avoided.

A still further object of this invention is to provide a transducer support assembly of the aforementioned type for supporting transducers that can be used to write and/or read information from two or more storage disks, such as magnetic disks, optically readable disks, capacitive pick-up disks, or the like.

Various other objects, advantages and features of the present invention will become readily apparent from the ensuing detailed description, and the novel features will be particularly pointed out in the appended claims.

SUMMARY OF THE INVENTION

In accordance with this invention, a transducer support assembly is provided for supporting two transducers in back-to-back relationship within a disk drive. The support assembly includes a support leg to which a pair of flexure elements is mounted in common, back-to-back relationship, these flexure elements being of substantially the same size and shape and formed of flexible material. The flexure elements are offset from each other such that their central axes are laterally displaced to avoid interference, and a transducer is supported on the distal end of each flexure element.

In one embodiment, the transducer support assembly is used with a disk-pack having at least two storage disks, the offset, back-to-back mounted flexure elements being disposed in the space between these two disks such that the head of one flexure element cooperates with, for example, the bottom surface of one disk and the head of the other flexure element cooperates with the top surface of the other disk.

Each flexure element has longitudinal edge members which function as stiffener loading beams, and but for the offset mounting of the back-to-back elements, these loading beams would interfere with each other, at least during an assembly (or loading) operation of the transducers with respect to the disks. In the preferred embodiment, each flexure element is of a generally triangular shape with the base of that shape being mounted to the support leg, as by a mounting plate welded to that base and screwed to the support leg. The dimensions of screw through-holes provided in the mounting plate of each flexure element is of sufficient dimension that the flexure elements can be offset from each other merely by laterally shifting the mounting plates (and the welded flexure elements) relative to each other.

The loading beams may be formed by bending the longitudinal side edges of each flexure element such that each bent edge and the main body of the flexure element form a substantially L-shape.

BRIEF DESCRIPTION OF THE DRAWINGS

The following detailed description, given by way of example, and not intended to limit the present invention solely to the embodiment shown herein, may best be understood in conjunction with the accompanying drawings in which.

DETAILED DESCRIPTION OF A CERTAIN PREFERRED EMBODIMENT

Figure 1:
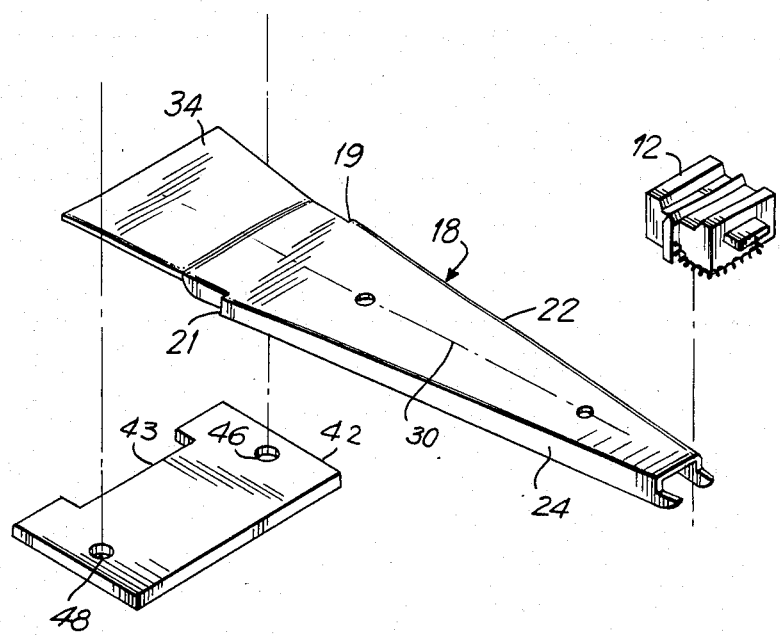
FIG. 1 is a perspective, exploded view of a portion of the transducer support assembly of the present invention.
Figure 2:
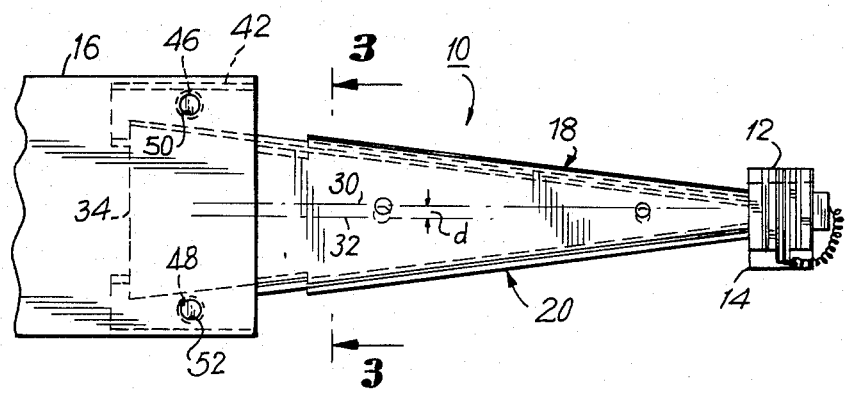
FIG. 2 is a top view showing the flexure elements mounted to a support leg, in accordance with the present invention.

Referring now to the drawings, wherein like reference numerals are used throughout, and in particular to FIG. 1, there is illustrated an exploded, perspective view of a flexure element 18 adapted to support a transducer 12, the flexure element being included in a transducer support assembly shown more particularly in FIG. 2. Flexure element 18 is formed of flexible material, such as stainless steel, spring metal, or the like. Preferably, the flexure element is substantially triangular in shape with transducer 12 mounted on or in the vicinity of the apex, as by a suitable cement or other mechanical mounting means. In the illustrated embodiment, transducer 12 is a magnetic head adapted to write/read information on/from the magnetic surface of a rotating disk; but it is contemplated that transducer 12 may comprise other conventional devices capable of at least reading information, such as an optical read head, a capacitive pick-up, or the like.

Flexure element 18 may, in one embodiment, comprise a substantially uniform triangle; but in the preferred illustrated embodiment, the flexure element is provided with a pair of indentations 19, 21 from which the body of the triangle continues, as shown. For the purpose of the present description, flexure element 18 is described as substantially triangularly shaped with a base portion 34 adapted to be mounted to a support leg 16, shown in FIG. 2, the support leg comprising a substantially rigid carrier as may be included in an actuator for transducer 12.

Flexure element 18 is formed of a relatively flat, elongated arm whose longitudinal side edges 22 and 24 are bent to form, with the arm, substantially L shapes. As shown in FIG. 1, side edges 22 and 24 are bent in the downward direction; and transducer 12 is mounted on the opposite surface of the elongated arm of flexure element 18 so as not to interfere with the downward bend of side edges 22 and 24. These side edges impart stiffening to flexure element 18 and function as so-called loading beams. A leg mounting portion, or plate, 42 is secured to base 34 of flexure element 18, as by welding. Although flexure element 18 may be mounted directly to support leg 16, it is preferred to utilize mounting plate 42 to provide a more positive, stiffer mount to the flexure element.

Mounting plate 42 may be of substantially rectangular shape having its shorter sides disposed in a direction parallel to central axis 30 of flexure element 18 and its longer sides substantially normal to that central axis. An indented cut-out portion 43 is provided along the trailing edge of mounting plate 42. The trailing edge of base 34 may extend to cut-out 43 of mounting plate 42 or, alternatively, the base may extend further to the trailing edge and have a cut-out section therein substantially coincidental with cut-out 43.

Mounting plate 42 is provided with a pair of screw through-holes 46 and 48, respectively. As shown more particularly in FIG. 4, screws 54 and 56 are adapted to pass through holes 46 and 48 to secure mounting plate 42 and flexure element 18 to support leg 16. Preferably, the diameter of each of holes 46 and 48 is sufficiently greater than the outer diameter of the threads of the mounting screws, whereby mounting plate 42 and flexure element 18 are adapted to be laterally adjustable within the tolerances defined by the diameter of the screw through-holes.

Figure 4:
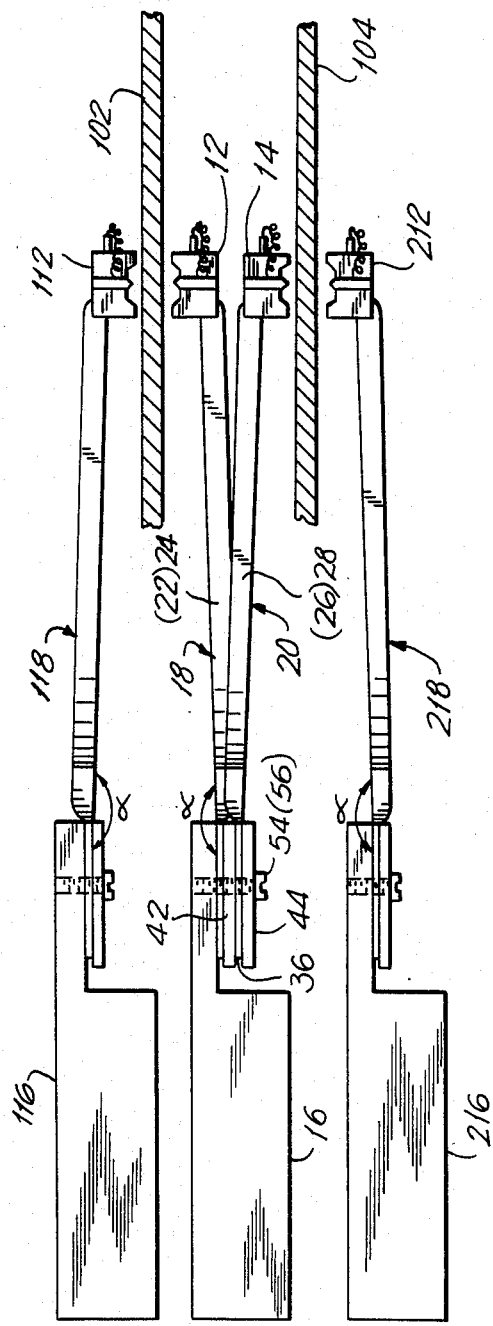
FIG. 4 is a side elevational view of one embodiment of the present invention as used with a disk-pack.

As shown in FIG. 1, and as is more apparent from FIG. 4, the elongated arm of flexure element 18 is bent at an angle, with respect to base 34 and mounting plate 42. Stated otherwise, the elongated arm is disposed in a plane that is at an angle with the plane in which base 34 (and mounting plate 42) is disposed. This angle is in the range of 178.5° to 179° while loading the support assembly into operative position within the disk drive, and this angle is approximately 176° when the support assembly is properly loaded; and when the flexure element and transducer 12 are operatively positioned with respect to the surface of a storage disk, this angle is in the direction to urge transducer 12 toward the disk. As shown in FIG. 4, when transducer 12 is adapted to cooperate with the bottom surface of a disk, the elongated arm of flexure element 18 is bent in the upward direction. Conversely, if transducer 12 is adapted to cooperate with the top surface of a storage disk, the elongated arm of flexure element 18 is bent in the downward direction relative to the base 34 and mounting plate 42.

Figure 3:
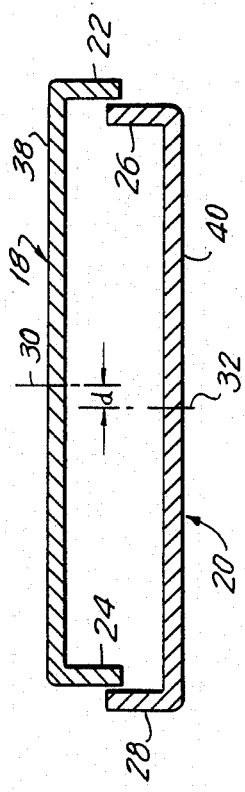
FIG. 3 is a sectional view taken along lines 3—3 of FIG. 2.

FIGS. 2-4 illustrate the manner in which two substantially identical flexure elements 18 and 20 are mounted in common, back-to-back relationship to support leg 16, in accordance with the present invention. Flexure element 20, like flexure element 18, is seen to be substantially triangularly shaped and supports a transducer 14 at the apex thereof. Base portion 36 of the triangular shape of flexure element 20 preferably is welded to a mounting plate 44, which is seen to be substantially identical to aforedescribed mounting plate 42 and is provided with a pair of screw through-holes 50 and 52. Flexure element 20 is provided with bent edge members 26 and 28 which, as shown in FIG. 3, are bent in the upward direction, each edge member forming with the elongated arm of the flexure element a substantially L shape.

The diameter of each of screw holes 50 and 52 is greater than the thread diameter of mounting screws 54 and 56 such that flexure element 20, like flexure element 18, may be adjustably laterally displaced while being screwed to support leg 16. As shown in FIGS. 2-4, flexure element 18 may be shifted in one direction while flexure element 20 is shifted in the opposite direction, yet screws 54 and 56 pass through screw holes 46, 50 and 48, 52, respectively, so as to secure mounting plates 44 and 42, and thus flexure elements 18 and 20, to support leg 16. The flexure elements are laterally displaced from each other by a distance d, this distance serving to define the lateral displacement of their respective central axes 30 and 32, as shown most clearly in FIGS. 2 and 3. As a numerical example, the minimum distance $d_{min}$ may be on the order of about 0.002 in. It is apparent from FIG. 3 that this lateral displacement d is sufficient to avoid interference between downwardly bent longitudinal edges 22 and 24 of flexure element 18 and upwardly bent longitudinal edges 26 and 28 of flexure element 20. The flexure elements thus may be flexed toward each other, as when transducer support assembly 10 initially is loaded into operative position with respect to a disk pack, without resultant interference between these longitudinal edges, or loading beams.

As is apparent from FIGS. 2 and 4, mounting plates 42 and 44 are screwed to support leg 16 in overlying back-to-back relationship. Preferably, two screws are used to mount the back-to-back flexure elements to the support leg; but if desired, only one screw centrally located with respect to the mounting plates can be used. However, it is possible that, with the use of a single screw, flexure elements 18 and 20 might be subject to unwanted rotation about the axis defined by that single screw. Alternatively, rivets may be used in place of screws to mount the flexure elements to the support leg.

The embodiment of FIG. 4 illustrates a practical embodiment wherein four transducers 12, 14, 112 and 212 are used with a disk-pack comprised of two storage disks 102 and 104, each transducer being cooperable with a respective surface of the disks. For convenience, these transducers are described as magnetic record/playback (or write/read) heads, but as mentioned above, the transducers may be optical or capacitive pick-up devices. Transducers 12 and 14 are supported at the distal ends of flexure elements 18 and 20, respectively, these flexure elements having base portions welded (or otherwise secured) to mounting plates 42 and 44 which, in turn, are mounted in back-to-back relationship on support leg 16 by means of mounting screws 54 and 56, all as discussed above and as particularly shown in FIG. 2. It is appreciated, therefore, that flexure elements are mounted to support leg 16 in offset relationship, as shown in FIG. 2, so as to avoid interference between the loading beams formed of the bent longitudinal edge members 22 and 24 of flexure element 18 and 26 and 28 of flexure element 20.

As illustrated in FIG. 4, transducer 12 cooperates with the bottom surface of disk 102 and transducer 14 cooperates with the top surface of disk 104. Flexure element 18 bends in the upward direction toward disk 102 and, conversely, flexure element 20 bends in the downward direction toward disk 104. From FIG. 4 (and also from FIG. 3) it is seen that a portion of side edges 24 and 28 overlap with each other, as does a similar portion of side edges 22 and 26 of flexure elements 18 and 20. Since the flexure elements are of substantially the same size and shape, the overlapping side edges would interfere with each other but for the lateral displacement of the central axes of the flexure elements. That is, the offset mounting of the flexure elements to support leg 16 avoids such interference.

It will be appreciated that, to facilitate a loading operation of transducer support assembly 10 with respect to disks 102 and 104, flexure elements 18 and 20 may be flexed toward each other to permit transducers 12 and 14 to be interposed safely in the space between these disks. The offset mounting of the flexure elements to support leg 16 avoids interference between the loading beams formed by the bent longitudinal edges thereof.

Transducer 112 is mounted at the distal end of a flexure element 118 which, for example, may be substantially identical to flexure element 18 or 20, this flexure element 118 being secured to a support leg 116 by a suitable mounting plate that is, for example, welded to the base portion of the flexure element, this mounting plate being screwed to support leg 116 in the same manner as the mounting of flexure element 18 or 20 to support leg 16. Likewise, transducer 212 is mounted at the distal end of a flexure element 218, this flexure element being substantially the same as aforementioned flexure element 18 or 20 and being secured to a support leg 216 by means of a mounting plate that is welded to this flexure element, the mounting plate being screwed to support leg 216 in a manner similar to that mentioned above with respect to mounting plates 42 and 44.

In the illustrated embodiment, wherein the disk pack is comprised merely of disks 102 and 104, only four transducers need be utilized, and these transducers may be mounted on four respective flexure elements supported by three support legs, as shown. In this embodiment, flexure element 118 is bent in the downward direction by the angle and flexure element 218 is bent in the upward direction by the angle. If the disk pack is comprised of further disks, requiring, for example, two additional transducers, support leg 116 (or 216) may be utilized to support flexure element 118 (or 218) and one additional flexure element in the same manner as support leg 16 supports flexure elements 18 and 20. Then, a still further support leg may be provided to support one more flexure element on which one more transducer is supported. Thus, it is seen that, when transducers are to be interposed in the space between adjacent disks, those transducers are supported on flexure elements which, in turn, are mounted in common and in back-to-back relationship on a single support leg, as shown and described in the foregoing specification.

While the present invention has been particularly shown and described with reference to a preferred embodiment, i will be readily appreciated by those of ordinary skill in the art that various changes and modifications may be made without departing from the spirit and scope of the invention. For example, although triangular shaped flexure elements are preferred, it is appreciated that other shapes may be adopted, if desired. Furthermore, when using triangular (or similar) shapes, the transducer has been described as being mounted on the apex of the triangular shape and located on the longitudinal axis thereof. The particular positioning of the transducer may be varied such that it is not disposed at the apex, nor is it located along the central axis of the flexure element. However, it is preferred that such central axial location be adopted so as to avoid problems that otherwise might be caused by an unbalance of the flexure element. Also, it is appreciated that the base of the flexure element may be mounted directly to the support leg; and the use of mounting plates (although preferred) thus can be omitted. Still further, although stainless steel is the preferred construction of the flexure element, spring metal may be used; and other equivalent flexible materials that provide adequate support for the transducer may be employed.

It is intended that the appended claims be interpreted as including the foregoing as well as various other such changes and modifications.

What is claimed is:

1. Transducer support assembly for supporting at least two transducers for playing/recording information from a magnetic disk, comprising:

a support leg;

a pair of flexure elements mounted in common to said support leg and each having first and second surfaces, the flexure elements exhibiting a substantially overlying relation such that said first surfaces face each other, the pair of flexure elements extending outwardly from said support leg and being of substantially the same size and shape and formed of flexible material, each flexure element having longitudinal edge members on opposite edges thereof, said edge members imparting stiffening to the flexure element, each said edge member of one flexure element being adjacent to one of the longitudinal edge members of the other flexure element, and each flexure element having a central axis;

a transducer supported on the distal end of each flexure element remote from said support leg and disposed on said central axis;

and the flexure elements of said common-mounted pair being offset from each other such that their central axes are displaced sideways from each other in a direction substantially parallel to the principal plane of said disk to avoid interference between the longitudinal edge members of one flexure element with the longitudinal edge members of the other.

2. The assembly of claim 1 wherein each flexure element is of a generally on the apex thereof; and means for mounting the base of the triangular shape flexure element on the support leg.

3. The assembly of claim 1 wherein each flexure element is formed of a relatively flat, elongated arm of spring metal whose longitudinal side edges are bent to form, with the arm, substantially L shapes.

4. The assembly of claim 1 wherein each flexure element includes a generally flat leg-mounting portion and an elongated arm extending from said leg-mounting portion on which said transducer is supported, the elongated arm being disposed in a plane that is at an angle with the plane in which said leg-mounting portion is disposed.

5. The assembly of claim 4 wherein said leg-mounted portion of each flexure element is provided with at least one screw through-hole; and further comprising at least one screw passing through the screw through-hole of both flexure elements to secure said flexure elements to said support leg with the leg-mounting portions of both flexure elements such that the flexure elements substantially overlie each other.

6. A transducer support assembly for supporting at least four transducers for use with a disc-pack having at least two storage discs, said assembly comprising a first support leg for supporting a first flexure element on which a first transducer is supported for operation with a first surface of a first of said storage discs, and a second support leg for supporting a second flexure element on which a second transducer is supported for operation with a second surface of a second of said storage discs; the improvement of a support for third and fourth transducers disposed in the space between said first and second storage discs for operation with the second surface of said first storage disc and the first surface of said second storage disc, respectively, and comprising:

a third support leg;

third and fourth flexure elements mounted in common to said third support leg and each having first and second surfaces, the flexure elements exhibiting a substantially overlying relation such that said first surfaces face each other, the third and fourth flexure elements extending outwardly from said third support leg and being of substantially the same size and shape and formed of flexible material, each flexure element having longitudinal edge members on opposite sides thereof, said edge members imparting stiffening to the flexure element, each said edge member of one flexure element being adjacent to one of the longitudinal edge members of the other flexure element, each of said third and fourth flexure elements having a central longitudinal axis;

third and fourth transducers supported on the distal ends of the third and fourth flexure elements, respectively, remote from said third support leg and disposed on the respective central longitudinal axes of said third and fourth flexure elements;

and said third and fourth common-mounted flexure elements being offset from each other such that their central longitudinal axes are displaced sideways from each other in a direction substantially parallel to the principal planes of said disk to avoid interference at least during positioning of the third and fourth transducers in the space between said first and second discs.

7. The assembly of claim 6 wherein each of said third and fourth flexure elements is of a generally triangular shape with a respective transducer supported generally on the apex thereof, the base of the generally triangular shape having a leg-mounting portion and means for securing both leg-mounting portions of said third and fourth flexure elements to said third support leg in common such that a substantial portion of the first surface of said third flexure element overlies a substantial portion of the first surface of said fourth flexure element; the first surfaces of said third and fourth flexure elements being displaced with respect to a plane of the leg-mounting portion in the range of 176° to 179°.

8. The assembly of claim 7 wherein each of said third and fourth flexure elements is formed of substantially flat, flexible material; and wherein each leg-mounting portion is comprised of a flat plate member secured to a surface of the base of said generally triangular shape.

9. The assembly of claim 8 wherein the side edges of said generally triangular shape of each of said third and fourth flexure elements are bent to form respective loading beams.

10. The assembly of claim 9 wherein said means for securing both leg-mounting portions of said third and fourth flexure elements to said third support leg comprises a pair of screws; and wherein the flat plate members of said third and fourth flexure elements are provided with screw through-holes of a tolerance greater than the diameter of each screw to permit a lateral shifting adjustment of the third flexure element relative to the fourth flexure element to offset said third and fourth flexure elements.

11. The assembly of claim 10 wherein said third and fourth flexure elements and said flat plate members are formed of spring metal; and wherein each flat plate member is welded to its respective flexure element.

12. The assembly of claim 9 wherein said means for securing both leg-mounting portions of said third and fourth flexure elements to said third support leg comprises a pair of rivets; and wherein the flat plate members of said third and fourth flexure elements are provided with through-holes of a tolerance greater than the diameter of each rivet to permit a lateral shifting adjustment of the third flexure element relative to the fourth flexure element to offset said third and fourth flexure elements.

* * * * *

UNITED STATES PATENT AND TRADEMARK OFFICE
CERTIFICATE OF CORRECTION

PATENT NO. : 4,807,054

DATED : February 21, 1989

INVENTOR(S) : Scott Sorensen and Michael S. Robidart

It is certified that error appears in the above-identified patent and that said Letters Patent is hereby corrected as shown below:

Claim 2, column 8, line 15, after "generally" insert --triangular shape with the transducer supported generally--.

Signed and Sealed this

Fifteenth Day of August, 1989

Attest:

DONALD J. QUIGG

Attesting Officer

Commissioner of Patents and Trademarks